(12) United States Patent
Wilkendorf

(10) Patent No.: US 7,232,158 B2
(45) Date of Patent: Jun. 19, 2007

(54) FITTING FOR FORMATION OF A FLUID-CONDUCTING CONNECTION

(75) Inventor: Werner Wilkendorf, Ottweiler (DE)

(73) Assignee: Hydac Filtertechnik GmbH., Sulzbach/Saar (DE)

( * ) Notice: Subject to any disclaimer, the term of this patent is extended or adjusted under 35 U.S.C. 154(b) by 104 days.

(21) Appl. No.: 11/059,342

(22) Filed: Feb. 14, 2005

(65) Prior Publication Data

US 2006/0049626 A1   Mar. 9, 2006

(30) Foreign Application Priority Data

Sep. 7, 2004   (DE) ...................... 10 2004 033 258

(51) Int. Cl.
*F16L 5/00* (2006.01)
(52) U.S. Cl. .................. 285/200; 285/202; 285/141.1; 285/142.1; 220/645
(58) Field of Classification Search ............. 285/141.1, 285/142.1, 139.1, 21.2, 200, 202; 220/643, 220/645, 694
See application file for complete search history.

(56) References Cited

U.S. PATENT DOCUMENTS

| | | | | | |
|---|---|---|---|---|---|
| 2,366,442 | A | * | 1/1945 | Cunningham | 285/200 |
| 2,370,799 | A | * | 3/1945 | Kelley | 285/200 |
| 2,457,066 | A | * | 12/1948 | Pepersack | 220/327 |
| 2,675,252 | A | * | 4/1954 | Haines | 285/200 |
| 4,023,257 | A | * | 5/1977 | Wright et al. | 29/460 |
| 4,212,488 | A | * | 7/1980 | Cook | 285/200 |
| 4,300,698 | A | * | 11/1981 | Williamson, Jr. | 220/694 |
| 4,504,535 | A | * | 3/1985 | Snyder | 428/137 |

* cited by examiner

*Primary Examiner*—David Bochna
(74) *Attorney, Agent, or Firm*—Roylance, Abrams, Berdo & Goodman, L.L.P.

(57) ABSTRACT

A fitting 5 forms of a fluid-conducting connection in an opening in a plastic wall 3 of a container 1, a tank in particular, for receiving a fluid, a hydraulic fluid in particular. The fitting has a connecting element 17 embedded on the edge of the opening in the plastic of the wall 3 of the container and provided with fasteners 15 accessible from the exterior of the container 1 by which a connection part 11 of the fitting 5 may be mounted on the connecting element 17.

22 Claims, 2 Drawing Sheets

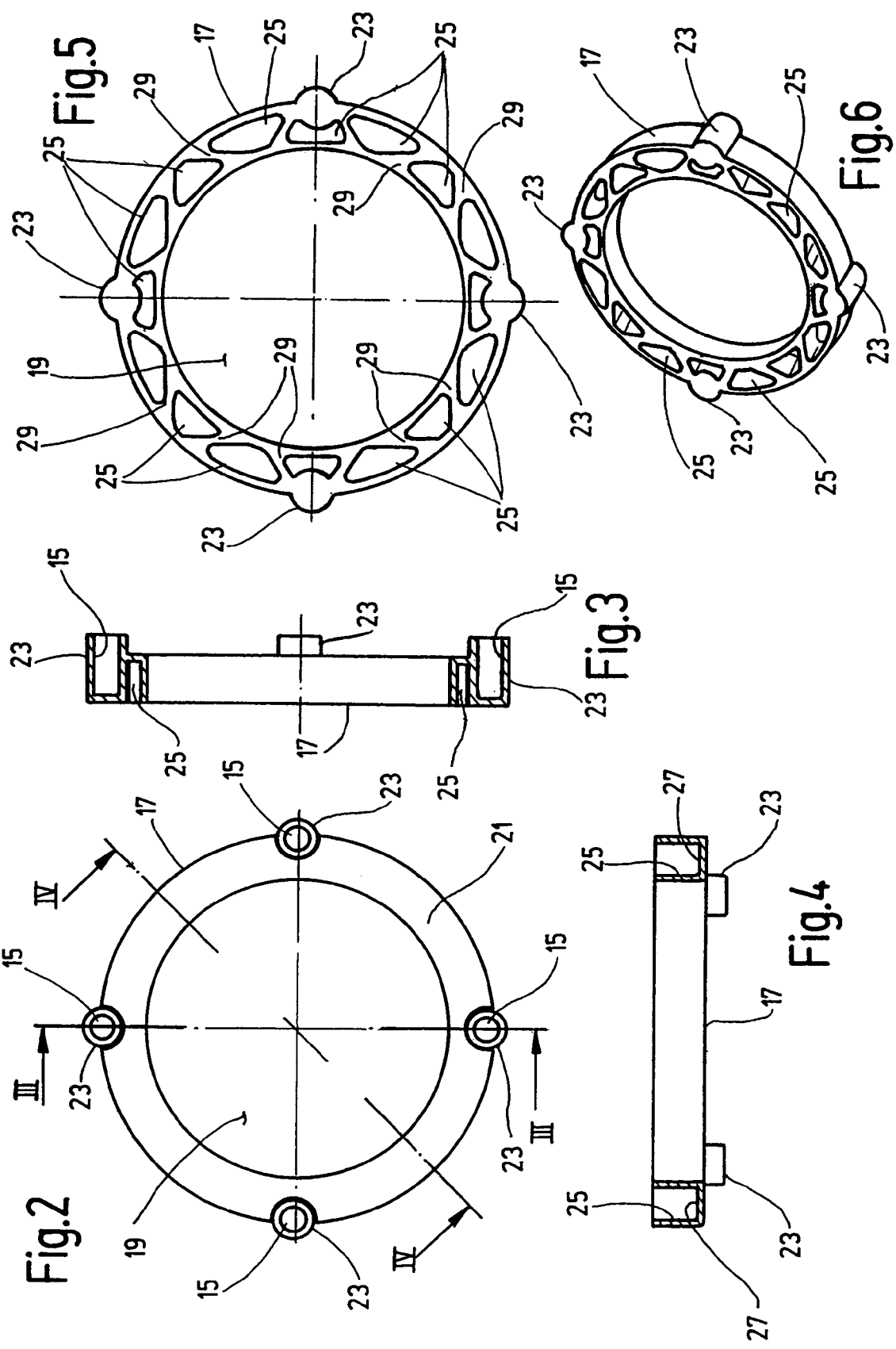

FITTING FOR FORMATION OF A FLUID-CONDUCTING CONNECTION

FIELD OF THE INVENTION

The present invention relates to a fitting for forming of a fluid-conducting connection on an opening in the wall of a container of plastic, in particular a tank for receiving a fluid, a hydraulic fluid in particular.

BACKGROUND OF THE INVENTION

Plastic tanks are widely used in hydraulic systems to contain hydraulic fluids. Because of the possibility of relatively simple configuration, low weight, and corrosion resistance, plastic tanks are extensively used especially in hydraulic systems of machines such as excavators, wheel loaders, and the like.

Such tanks are usually produced by well-known rotomolding or blow molding processes. Polyethylene or polyamide plastics, for example, are used for larger containers such as tanks for hydraulic fluids.

The advantages of corrosion resistance, low weight, and ease of molding are offset in the case of plastic tanks, however, by the disadvantage that production of fluid-conducting connections on openings in the plastic wall of the container or tank has certain difficulties. Because of the physical properties of the plastic material, the danger exists that deformations may occur in the area of the opening as a result of sealing forces and temperature effects. Such deformations can lead to leaking between plastic tanks and add-on elements, even if costly sealing elements are employed.

SUMMARY OF THE INVENTION

An object of the present invention is to provide a fitting permitting an operationally reliable long-term leak-free connection to an opening in a plastic container.

According to the present invention, this object is attained by a fitting having a connecting element enclosing the opening in the container and embedded in the plastic of the wall of the container. A reinforcing element is provided with fastening means for mounting of the connecting element. The loads acting on the connection, such as fastening force, sealing force, dynamic (vibration) and thermal effects, do not act directly on the plastic material of the container wall. Rather, such loads act on the connecting element forming a reinforcing element. Embedding of a connecting element, which is made of an appropriately selected material with the operating loads taken into account, preferably metal or a duroplastic of high fatigue strength and thermal stability, affords reliable protection from deformation of the plastic material of the container wall, so that a connection reliable in operation and free of leaks is ensured.

The connecting element may be advantageously in the form of an inserted element molded into the wall of the container in the molding process in rotomolding of the plastic container.

When the opening in the container is round, the connecting element preferably is configured as a metal annular element. The annular opening of the annular element encloses and is aligned with the opening in the container. The annular element may be of an aluminum alloy produced by injection molding, extrusion, or the like, and preferably is configured so that it has a level annular surface on its side associated with the outside of the container. It may be flush with the exterior of the wall of the container surrounding the opening. As an alternative, the annular element may be molded into the wall of the container so that the annular element is slightly recessed in the container wall.

An especially close connection of annular element and the plastic wall of the container is obtained if the side of the annular element facing the inside of the container has a plurality of pouch-like recesses. If the annular element is molded as an inserted element in rotomolding of the container, the plastic material entering the pouch-like recesses forms a serration of the annular element with the container wall and provides correspondingly good securing of the annular element against loads.

The annular element may have bores for retaining screws as fastening means for mounting, for example, a flange for fastening the respective closing element.

Preferably, the bores are configured as blind-end bores with interior threading and are provided at regular angular distances on the circumferential edge of the annular element.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 2 is a top plan view of the annular element of the fitting of FIG. 1;

FIGS. 3 and 4 are side elevational views in section taken along lines III—III and IV—IV, respectively, in FIG. 2;

FIG. 5 is a bottom plan view of the annular element shown in FIG. 2;

FIG. 6 is a perspective view in the line of sight of the bottom of the annular element shown in FIG. 5, but drawn on a somewhat smaller scale.

DETAILED DESCRIPTION OF THE INVENTION

Figure 1:
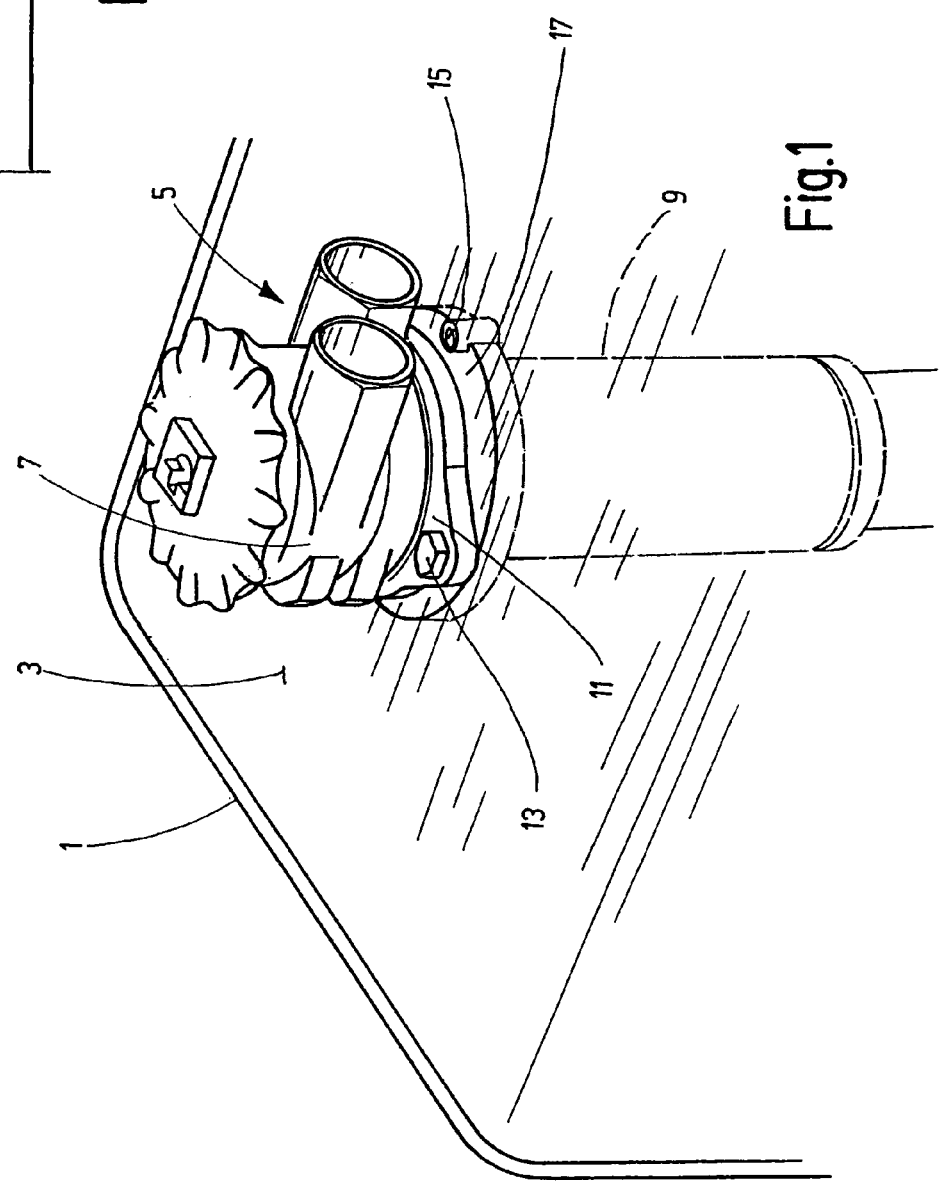
FIG. 1 is detached and simplified perspective view in diagram form of a part of the upper side of the plastic tank having a fitting according to an embodiment of the invention, forming a connection for a so-called tank-top filter.

FIG. 1 illustrates a part of the upper side of a container in the form of a plastic tank 1 made of a plastic material suitable for larger containers by the known rotomolding process (cf. Schaab/Stoeckhert, ΛKunststoff Maschinenführer@ [Plastic Machine Operator]), pages 561–564). A tank opening is formed on the upper side in the rotomolding process. In the opening in the plastic wall 3, a fitting 5 is provided for a fluid-conducting, leak-free connection to a connecting element represented in the embodiment illustrated by the connecting head 7 of a tank-top filter the filter element 9 projecting through the opening to the interior of the tank 1. The connecting head 7 has a fastening flange 11 mounted on the tank 1 by two retaining screws 13, only one of which is visible in FIG. 1.

The retaining screws 13 extend through the fastening flange 11, and are screwed into internally threaded blind-end bores 15 provided on a connecting element configured as an annular element 17, additional details of which are illustrated in FIGS. 2 to 6. The annular element 17, in the present exemplary embodiment, is made of an aluminum alloy, and is molded as an inserted element in rotomolding of the tank 1 so that the round annular opening 19 forms the opening in the tank.

In FIGS. 2 to 6, the annular element 17 has on its upper side, which is flush with the exterior of the plastic wall 3 of the tank 1, a level annular surface 21 interrupted only by four cylindrical pins 23 spaced at angular distances of 90°. These pins project a short distance axially above the annular surface 21, and are positioned on the circumferential edge so that they also project a certain distance radially beyond the circumferential edge of the annular element 17. As shown in FIG. 1, only two of the four blind-end bores 15 on the annular element 17 are used for engagement of retaining screws 13.

In FIGS. 4 to 6, pouch-like recesses 25 are made in the lower side of the annular element 17, all of which are not identified by number in FIGS. 5 and 6. Each recess 25 has a level bottom 27 (see FIG. 4) and is of a depth which, as is shown the most clearly in FIG. 4, amounts to more than three-fourths of the axially measured thickness of the annular element 17. As seen in FIG. 5, the recesses 25 are positioned in sequence approximately in the center between the unrecessed outer edge of the annular element and the unrecessed inner edge of the annular element. Except in the area of the recesses positioned in the area of the pins 23 of the blind-end bores 15, the recesses 25 are more or less triangular in outline and are arranged in succession so that unrecessed areas of the annular element 17 in the form of ribs 29 remain between adjacent recesses 25. The ribs 29 extend between the annular opening 19 and the circumferential edge of the annular element 17. Consecutive ribs 29 extend diagonally in an opposite direction relative to each other.

To effect sealing between annular element 17 and connecting element, the level annular surface 21 in the area between annular opening 19 and the pins 23 on the annular element 17 may be provided as a sealing surface adjoining an axial seal, for example. In the example illustrated in FIG. 1, sealing between annular element 17 and fastening flange 11 of the connecting head 7 is effected by a radial seal (not shown) between fastening flange 11 and the inside of the annular opening 19 in the annular element 17.

Figure 7:
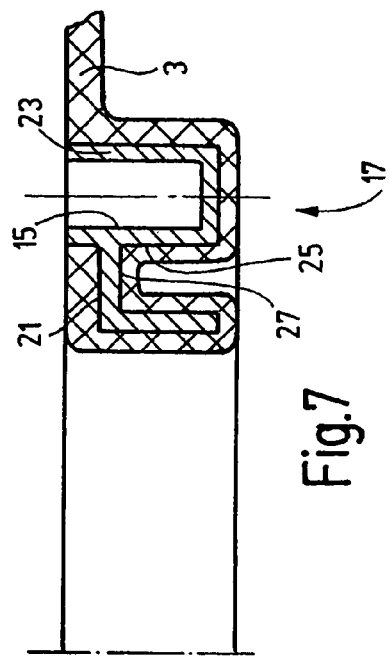
FIG. 7 is a partial and enlarged side elevational view in section of part of the upper side of a plastic tank with a molded annular element recessed into the tank wall of FIG. 1.

As is shown by FIG. 7, the annular element 17 need not be molded into the tank wall 3 so that the annular surface 21 is flush with the outside of the wall 3. The annular element 17 may be embedded in the wall 3. As illustrated by FIG. 7, the upper side of the pins 23 with the blind-end bores 15 may be flush with the outside of the wall 3. As FIG. 7 also shows, the outside of the annular element 17 is enclosed in its entirety in the plastic material of the wall 3, this material also penetrating the recesses 25.

While various one embodiment has been chosen to illustrate the invention, it will be understood by those skilled in the art that various changes and modifications can be made therein without departing from the scope of the invention as defined in the appended claims.

What is claimed is:

1. A fitting for forming a fluid-conducting connection in an opening in a plastic wall of a container receiving a fluid, comprising:
a connecting element embedded in an edge of an opening of a plastic container wall, said connecting element being a metal annular element with an annular opening enclosing and aligned with the opening in the plastic container wall and with a plurality of pouch-like recesses in a side thereof facing an interior of the container;
fasteners accessible from an exterior of the container; and
a connection part being mounted on said connecting element by said fasteners.

2. A filling according to claim 1 wherein
said connecting element is an inserted element rotomolded into the plastic container wall of the container formed by rotomolding.

3. A fitting according to claim 1 wherein
said annular element comprises a level annular surface on a side thereof associated with a container exterior.

4. A filling according to claim 3 wherein
said annular surface is substantially flush with the plastic container wall surrounding the opening therein.

5. A fitting according to claim 3 wherein
a part of said level annular surface is a sealing surface for supporting a sealing element to form a seal opposite said connection part.

6. A fitting according to claim 1 wherein
said annular element comprises bores receiving said fastener, said fasteners engaging a fastening flange of said connection part.

7. A fitting according to claim 6 wherein
said bores are blind-end bores, are internally threaded, and are spaced at regular angular distances along a circumferential edge of said annular element.

8. A fitting according to claim 7 wherein
said blind-end bores are formed in cylindrical pins projecting axially from said annular element.

9. A fitting according to claim 1 wherein
said pouch-like recesses have a depth equal to at least three fourths of an axial thickness of said annular element.

10. A fitting according to claim 9 wherein
a majority of said pouch-like recesses are substantially triangular, and are positioned in sequence to form ribs in non-recessed, adjacent areas of said annular element, with successive ribs extending diagonally in opposite directions relative to one another.

11. A fitting according to claim 10 wherein
said pouch-like recesses are positioned centrally between non-recessed outer and inner edges of said annular element.

12. A plastic container receiving a fluid, comprising:
a plastic wall having an opening thereon;
a connecting element embedded in an edge of said opening, said connecting element being a metal annular element with an annular opening enclosing and aligned with said opening in said plastic wall and with a plurality of pouch-like recesses in a side thereof facing an interior of the container;
fasteners accessible from an exterior of the container; and
a connection part being mounted on said connecting element by said fasteners.

13. A plastic container according to claim 12 wherein
said connecting element is an inserted element rotomolded into said plastic wall of the container formed by rotomolding.

14. A plastic container according to claim 12 wherein
said annular element comprises a level annular surface on a side thereof associated with an exterior of the container.

15. A plastic container according to claim 14 wherein
said annular surface is substantially flush with said plastic wall surrounding said opening therein.

16. A plastic container according to claim 14 wherein
a part of said level annular surface is a sealing surface for supporting a sealing element to form a seal opposite said connection part.

17. A plastic container according to claim 12 wherein
said annular element comprises bores receiving said fasteners, said fasteners engaging a fastening flange of said connection part.

18. A plastic container according to claim 17 wherein
said bores are blind-end bores, are internally threaded, and are spaced at regular angular distances along a circumferential edge of said annular element.

19. A plastic container according to claim 18 wherein
said blind-end bores are formed in cylindrical pins projecting axially from said annular element.

20. A plastic container according to claim 12 wherein
said pouch-like recesses have a depth equal to at least three fourths of an axial thickness of said annular element.

21. A plastic container according to claim 20 wherein
a majority of said pouch-like recesses are substantially triangular, and are positioned in sequence to form ribs in non-recessed, adjacent areas of said annular element, with successive ribs extending diagonally in opposite directions relative to one another.

22. A plastic container according to claim 21 wherein
said pouch-like recesses are positioned centrally between non-recessed outer and inner edges of said annular element.

* * * * *